United States Patent
Baillon et al.

(10) Patent No.: US 7,423,736 B2
(45) Date of Patent: Sep. 9, 2008

(54) LOW-COST DOPPLER FREQUENCY SHIFT MEASURING DEVICE

(75) Inventors: Bertrand Baillon, Pins Justaret (FR); Jean-Pierre Schlotterbeck, Rochefort-Samson (FR); Xavier Lacondemine, Valence (FR)

(73) Assignee: Thales, Neuilly sur Seine ( * ) Notice: Subject to any disclaimer, the term of this patent is extended or adjusted under 35 U.S.C. 154(b) by 0 days.

(21) Appl. No.: 11/579,503

(22) PCT Filed: Mar. 17, 2005

(86) PCT No.: PCT/EP2005/051239

§ 371 (c)(1),
(2), (4) Date: Nov. 3, 2006

(87) PCT Pub. No.: WO2005/114252

PCT Pub. Date: Dec. 1, 2005

(65) Prior Publication Data

US 2007/0229799 A1 Oct. 4, 2007

(30) Foreign Application Priority Data

May 4, 2004 (FR) .................................. 04 04760

(51) Int. Cl.
*G01P 3/36* (2006.01)
(52) U.S. Cl. ........................................ 356/28; 356/28.5
(58) Field of Classification Search ................... 356/28, 356/28.5
See application file for complete search history.

(56) References Cited

U.S. PATENT DOCUMENTS

| | | | |
|---|---|---|---|
| 4,818,071 A | 4/1989 | Dyott | |
| 4,902,127 A | 2/1990 | Byer et al. | |
| 5,365,335 A * | 11/1994 | Sorin | ................ 356/479 |
| 6,002,480 A * | 12/1999 | Izatt et al. | ................ 356/479 |
| 6,608,669 B2 | 8/2003 | Holtom | |
| 6,992,776 B2 * | 1/2006 | Feldchtein et al. | ........ 356/479 |
| 2003/0151732 A1 | 8/2003 | Rogers et al. | |

FOREIGN PATENT DOCUMENTS

FR 2 761 162 A 9/1998

OTHER PUBLICATIONS

James S W et al: "Fibre Optic Based Reference Beam Laser Doppler Velocimetry" Optics Communications, North-Holland Publishing Co. Amsterdam, NL Sep. 15, 1995.

* cited by examiner

*Primary Examiner*—Thomas H. Tarcza
*Assistant Examiner*—Timothy A Brainard
(74) *Attorney, Agent, or Firm*—Lowe Hauptman Ham & Berner, LLP

(57) ABSTRACT

The invention relates to a Doppler frequency shift measuring device of the optical type comprising an optical signal channel delivering, through a polarization-splitting coupler, through a bidirectional signal port of the coupler, a signal light beam illuminating a reference medium, the coupler receiving, through said bidirectional port, a backscattered light beam returned by the reference medium; a reference channel providing a reference light beam for detection of the Doppler frequency shift, the frequency shift being determined by the frequency shift between the light signal illuminating the reference medium and the light beam returned by the reference medium. The reference light beam is applied to a reference port of the polarization-splitting coupler, said coupler delivering, at a port, a beat signal between the frequency of the reference light beam applied to the port and the frequency of the backscattered light beam applied to the port, possibly containing the Doppler shift.

5 Claims, 2 Drawing Sheets

LOW-COST DOPPLER FREQUENCY SHIFT MEASURING DEVICE

FIELD OF THE INVENTION

The invention relates to a Doppler shift measuring device of the optical type.

BACKGROUND OF THE INVENTION

In devices comprising a laser source and coherent heterodyne detection, it may be necessary to determine a frequency change (Doppler effect) produced on part of the path of the laser beam and resulting from a physical phenomenon that is to be compensated for or measured. This is in particular the case of lidars serving to measure the speed and direction of the wind by backscattering of the laser beam from aerosols carried by the wind. This frequency change is generally determined by mixing the signal received with a signal generated by a local oscillator and affected by a frequency shift which is produced by a modulator of the electrooptic or acoustooptic type (AOM).

Devices of this type are also used for measuring the speeds of aircraft in relation to the surrounding medium. The device is known in this application as an "anemometer".

The measuring distance defines the type of detection of the Doppler shift to be measured and the power of the light source of the anemometer and therefore detection may be either coherent detection or direct or incoherent detection.

In the case of coherent heterodyne detection, the beam coming from the light radiation source (laser) is split in two, one part being shaped spatially and conveyed into the measuring zone. An acoustooptic modulator shifts the frequency of the beam of the reference channel. The backscattered signal is then mixed with the shifted reference so as to generate interference in a detector.

In the anemometer application, a laser beam, generated by a laser source, is focused at a certain distance from the aircraft. Aerosols present in the atmosphere backscatter the incident beam producing a shift of its emission frequency. The Doppler frequency, that is to say the shift between the frequency of the backscattered beams and the incident beam is detected by an interferometer in order to deduce the speed of the aircraft. It is known that the Doppler frequency Fd has the value of:

$$Fd = 2v/\lambda$$

v being the projection, onto the line of sight of the laser, of the aircraft speed relative to the ambient medium (atmosphere), that is to say the reference with respect to which the speed of movement of the aircraft is to be measured, $\lambda$ being the wavelength of the emitted beam.

FIG. 1 shows a block diagram of a Doppler shift measuring device of the optical type, of the prior art.

The device of FIG. 1 comprises in particular a laser unit 10, a mixing and detection unit 12 and an optical head 14, these elements 10, 12, 14 corresponding to the main functions of the measuring device.

The laser unit 10 comprises a laser source SL and a polarization-maintaining coupler (PMC) 18 delivering a first optical signal for accessing a signal channel 20 and a second optical signal for accessing a reference channel 22.

The first optical signal in the signal channel 20 is amplified by an optical amplifier (Amp) 26 delivering an optical power signal to be emitted into the reference medium.

The optical power signal leaving the signal channel 20 accesses, via a polarization-splitting coupler (PSC) 32 and a bidirectional optical link 34 of the mixing/detecting unit 12, the optical head 14 radiating a laser beam Fem into the reference medium.

The optical head 14 ensures, on the one hand, focusing of the emitted laser beam Fem in the reference medium and, on the other hand, captures the rays Frd backscattered by the medium in a set direction.

The backscattered rays Frd captured by the optical head, possibly containing a Doppler shift, are conveyed by the bidirectional optical link 34 to the polarization-splitting coupler 32 which delivers a backscattered optical signal Pr, on account of the rotation of the polarization of the backscattered signal relative to the emitted signal, by means of a $\lambda/4$ optical plate 35 at a signal return output Sr.

The detection/mixing unit 12 additionally includes a polarization-maintaining coupler (PMC) 40 receiving, at one of its inputs Es, the reference signal Pol leaving the reference channel of the laser unit 10 and, at another input Er, the backscattered signal Pr. The PMC coupler 40 mixes the reference signal and the backscattered signal, possibly containing the Doppler shift, generating interference signals applied to a detector Dt 42.

Signal processing applied to the detector Dt 42 then makes it possible to extract, from the Doppler shift, the measurement of speed of movement v.

In other structures (not shown) detection of the Doppler shift may be of the heterodyne type and, to this end, a frequency shift of one of the two channels is achieved with the aid for example of an acoustooptic modulator (frequency shift by the AOM).

SUMMARY OF THE INVENTION

It is desired to reduce the cost of these types of structure due to the number of components necessary for this detection and, to this end, the invention provides a Doppler frequency shift measuring device of the optical type comprising:

an optical signal channel delivering, through a polarization-splitting coupler PSC, through a bidirectional signal port S1 of the coupler, a signal light beam illuminating a reference medium, the coupler receiving, through said bidirectional port S1, a backscattered light beam returned by the reference medium; and a reference channel delivering a reference light beam for detection of the Doppler frequency shift, the frequency shift being determined by the frequency shift between the light signal illuminating the reference medium and the light signal returned by the reference medium, characterized in that the reference light beam is applied to a reference port S2 of the polarization-splitting coupler, said coupler delivering, at a port E2, a beat signal Bs between the frequency of the reference light beam applied to the port S2 and the frequency of the backscattered light beam applied to the port S1, possibly containing the Doppler shift.

The polarization-splitting coupler PSC comprises four optical ports E1, E2 and S1, S2, the coupler being configured so that:

an optical signal applied to its port E1 is transmitted to its port S1 without change of polarization; and an optical signal applied to its port S1 produces, at its port E2, by beating with a reference optical signal applied to its port S2, a beat signal Bs corresponding to the frequency shift between the reference beam and the beam backscattered by the medium.

A principal objective of this invention is the elimination of the coupler mixing the beam containing the Doppler shift with the reference beam.

Another objective is a reduction of the manufacturing cost of the measuring device as well as an increase in its reliability by a reduction in the number of its subassemblies.

BRIEF DESCRIPTION OF DRAWINGS

The invention will be better understood by the description of the Doppler shift measuring device according to the invention with reference to the appended drawings, in which.

DETAILED DESCRIPTION OF EMBODIMENTS

Figure 2:
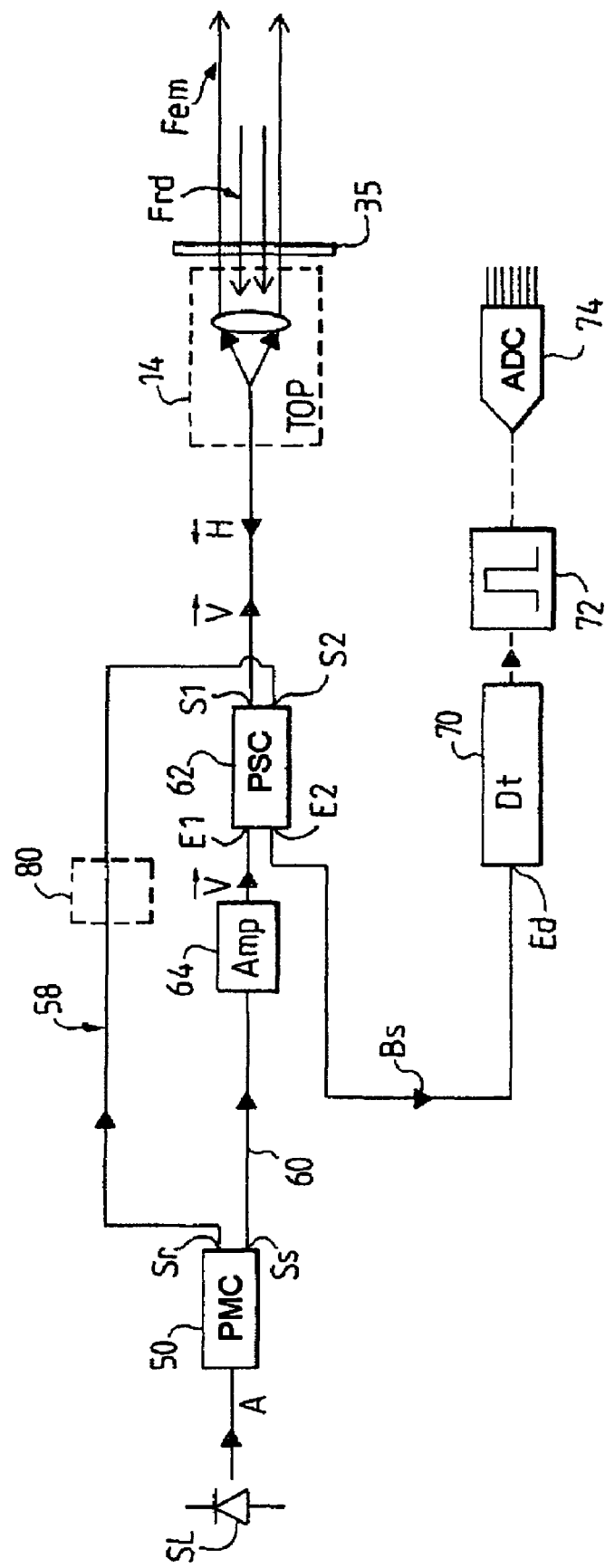
FIG. 2 represents an embodiment of the measuring device according to the invention.

FIG. 2 represents an embodiment of the measuring device according to the invention.

The device of FIG. 2 essentially comprises:

- a laser source SL providing a light beam at input A of an optical polarization-maintaining coupler PMC 50, the optical coupler 50 delivering through a reference optical output Sr, a reference light beam forming a reference channel 58 and, through an optical signal output Ss, a signal light beam with the same polarization as the polarization of the beam of reference channel, forming a signal channel 60. The polarization of the signal channel 60 is then rotated so as to be perpendicular to the reference channel 58;
- a polarization-splitting coupler PSC 62 having four ports E1, E2, S1, S2.

The PSC coupler 62 receives through the port E1, through an optical amplifier Amp 64, the output signal light beam Ss of the polarization-maintaining coupler PMC of the signal channel 60 and, through its port S2, the output reference light beam Sr of the polarization-maintaining coupler PMC of the reference channel 58. The port E2 of the coupler is connected to an input Ed of a beat detector 70 delivering a signal containing the Doppler shift.

In a known manner, the optical signal Frd backscattered by the medium is directed by the optical head 14 to the port S1 of the coupler with a crossed polarization ($\lambda$/4 optical plate 35) with respect to the polarization of the signal emitted by the PSC coupler to the optical head. The backscattered signal, by being mixed in the polarization-splitting coupler PSC 62 with the reference signal applied at its port S2, produces a beat signal Bs appearing on the port E2 of the coupler.

The device comprises, at the output from the beat detector 70, a band filter 72 followed by an analog/digital converter ADC 74 for extracting the Doppler shift.

The beat signal Bs, possibly containing the Doppler shift, is then detected by the detector 70, filtered by the band filter 72 and then digitized by the analog/digital converter ADC 74 for extraction of the Doppler shift.

In the detection device according to the invention, all the accessible ports of the polarization-splitting coupler PSC are used. The reference light beam of the reference channel 58 is injected directly at the port S2 of the polarization-splitting coupler and the device is produced so that the polarization directions of the beam of the reference channel applied to the port S2 of the polarization-splitting coupler PSC and that of the beam Frd backscattered by the reference medium, applied to the port S1 of said coupler, are parallel. FIG. 2 shows, by means of vectors H and V, an example of the polarization directions of the light beams.

In the embodiment of FIG. 2 according to the invention, by way of an example, the power of the optical signal applied to the port E1 of the polarization-changing coupler is of the order of 30 dBm, the level of the backscattered signal on the port S1 is of the order of −100 dBm, and the reference signal applied to the port S2 of the coupler is of the order of 0 dBM.

In an alternative embodiment of FIG. 2, the device includes, in the reference channel 58, an optical isolator 80 improving the optical isolation between the respective ports Sr and S2 of the two couplers PMC 50 and PSC 62. The optical isolator 80 in the reference channel is represented by dotted lines on FIG. 2.

The invention can be applied to all types of detection, for example for heterodyne detections (frequency shift of two channels), comprising an acoustooptic modulator in the path of one of the two optical channels.

The invention can be applied in the case of continuous operation with continuous emission of the signal in the reference medium or of a pulsed emission.

The invention is also applicable in architectures using signal channel modulation (electrooptic Q-switch).

Figure 1:
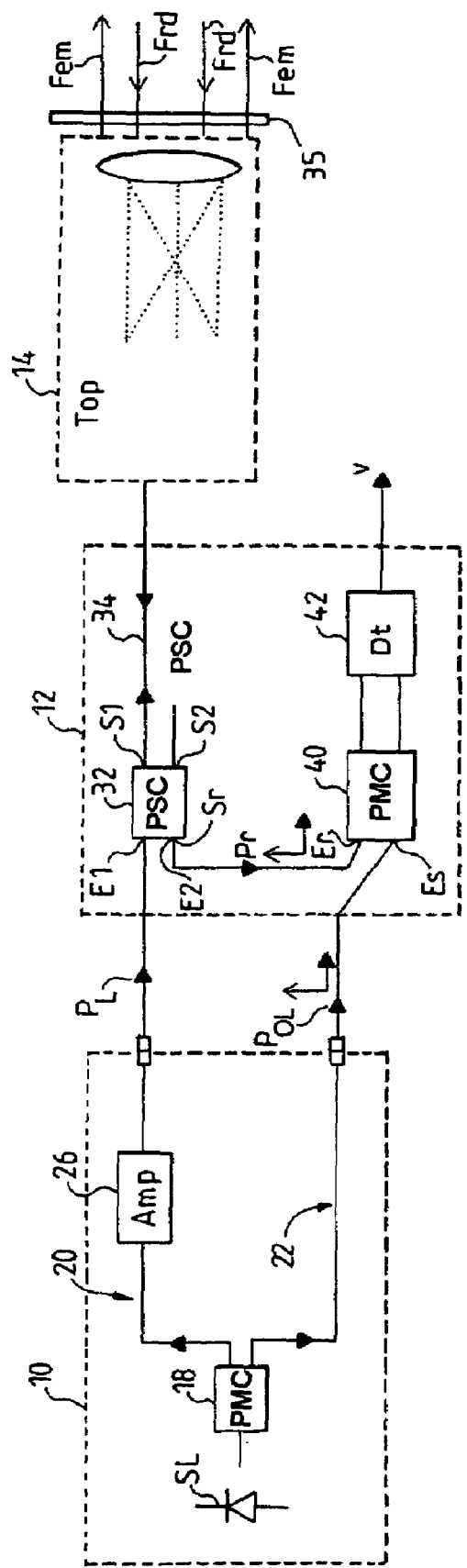
FIG. 1, already described, shows a block diagram of a device of the prior art for measuring a Doppler shift, of the optical type.

The invention has economic value on account of the reduction in cost of the measuring device, not only by eliminating the polarization-maintaining coupler 40 (see FIG. 1) of the device of the prior art, but also by reducing the number of optical fibers and optical connectors that are necessary.

The invention additionally makes possible a reduction in coupling losses, in this way ensuring better performance of the device.

The invention claimed is:

1. A Doppler frequency shift measuring device of the optical type comprising:
   a laser source, optical polarization-maintaining coupler, a reference channel and a signal channel, wherein the light source is configured to provide a light beam to the optical polarization-maintaining coupler;
   the optical polarization-maintaining coupler comprises an input, a reference optical output, and a signal optical output; wherein
      the input of the optical polarization-maintaining coupler is configured to receive the light beam from the light source;
      the reference optical output is configured to provide a reference light beam to the reference channel;
      the signal optical output is configured to output a signal light beam with the same polarization as the polarization of the beam of the reference channel to the signal channel; and
      the polarization of the signal channel being then rotated so as to be perpendicular to the reference channel;
   the reference channel configured to provide a reference light beam for detection of the Doppler frequency shift, the frequency shift being determined by the frequency shift between the light signal illuminating a medium and the light beam returned by the medium,
   the signal channel comprises a polarization-splitting coupler PSC having four ports E1, E2, S1 and S2 configured so that:
      the optical signal light beam applied at E1 is transmitted to S1 without change of polarization;
      the reference light beam is applied to the reference port S2 of the polarization-splitting coupler, said coupler delivering, at the port E2, a beat signal between the frequency of the reference light beam applied to the port S2 and the frequency of the backscattered light beam applied to the port S1, possibly containing the Doppler shift.

2. The measuring device a claimed in claim 1, wherein
the port E1 of the polarization-splitting coupler is configured to receive, through an optical amplifier Amp, the output signal light beam of the polarization-maintaining coupler of the signal channel;
the port S2 of the polarization-splitting coupler is configured to received the output reference light beam of the polarization-maintaining coupler of the reference channel; and
the port E2 of the polarization-splitting coupler is connected to an input of a beat detector and delivering a signal containing the Doppler shift to the input of the beat detector.

3. The measuring device as claimed in claim 2, wherein it includes, at the output from the beat detector, a band filter followed by an analog/digital converter for extracting the Doppler shift.

4. The measuring device as claimed in claim 1, wherein the polarization directions of the beam of the reference channel applied to the port S2 of the polarization-splitting coupler and that of the beam backscattered by the reference medium, applied to the port of said coupler, are parallel.

5. The measuring device as claimed in claim 1, wherein the device includes in the reference channel an optical isolator improving the optical isolation between the respective ports of the two couplers.

* * * * *